United States Patent
Brodsky et al.

(10) Patent No.: US 10,970,286 B2
(45) Date of Patent: *Apr. 6, 2021

(54) CHARACTER MATCHING IN TEXT PROCESSING

(71) Applicant: International Business Machines Corporation, Armonk, NY (US)

(72) Inventors: Gregory Brodsky, Jerusalem (IL); Tomer Mahlin, Jerusalem (IL)

(73) Assignee: International Business Machines Corporation, Armonk, NY (US)

(*) Notice: Subject to any disclaimer, the term of this patent is extended or adjusted under 35 U.S.C. 154(b) by 89 days.

This patent is subject to a terminal disclaimer.

(21) Appl. No.: 16/203,678

(22) Filed: Nov. 29, 2018

(65) Prior Publication Data

US 2019/0095489 A1     Mar. 28, 2019

Related U.S. Application Data

(63) Continuation of application No. 15/138,819, filed on Apr. 26, 2016, now Pat. No. 10,169,414.

(51) Int. Cl.
| | |
|---|---|
| *G06F 17/00* | (2019.01) |
| *G06F 16/2455* | (2019.01) |
| *G06F 16/242* | (2019.01) |
| *G06F 16/2452* | (2019.01) |
| *G06F 40/129* | (2020.01) |

(52) U.S. Cl.
CPC ...... *G06F 16/2455* (2019.01); *G06F 16/2433* (2019.01); *G06F 16/2452* (2019.01); *G06F 16/2456* (2019.01); *G06F 40/129* (2020.01)

(58) Field of Classification Search
None
See application file for complete search history.

(56) References Cited

U.S. PATENT DOCUMENTS

| | | | | |
|---|---|---|---|---|
| 6,799,914 | B2* | 10/2004 | Eo | G06F 3/018 341/22 |
| 7,603,365 | B2* | 10/2009 | Chen | G06F 16/24534 |
| 8,660,835 | B2 | 2/2014 | Mousaad | |
| 9,081,761 | B1* | 7/2015 | Little | G06F 40/232 |
| 9,442,980 | B1 | 9/2016 | Trepetin et al. | |
| 9,501,708 | B1* | 11/2016 | Ahmad | G06K 9/00879 |
| 2006/0053107 | A1* | 3/2006 | Stuart | G06F 16/2455 |
| 2007/0106492 | A1* | 5/2007 | Kim | G06F 3/0233 704/9 |
| 2007/0203894 | A1 | 8/2007 | Jones et al. | |
| 2007/0250494 | A1 | 10/2007 | Peoples et al. | |

(Continued)

OTHER PUBLICATIONS

IBM, List of IBM Patents or Patent Applications Treated as Related, Nov. 27, 2018, 2 pages.

*Primary Examiner* — Hasanul Mobin
(74) *Attorney, Agent, or Firm* — Stosch Sabo (57) ABSTRACT

A structured query language (SQL) query can contain a target text comprising respective characters in un-shaped format (also known as base format). The target text can be shaped according to the position of respective characters within the target text and other factors to generate a plurality of shaped target texts. The plurality of shaped target texts can be combined in a modified SQL query. The modified SQL query can be executed against one or more databases storing text in shaped format.

20 Claims, 6 Drawing Sheets

(56) References Cited

U.S. PATENT DOCUMENTS

| | | |
|---|---|---|
| 2007/0262991 A1 | 11/2007 | Abulhab |
| 2011/0107202 A1 | 5/2011 | El-Shishiny et al. |
| 2012/0229472 A1* | 9/2012 | Yamahara ............... G06F 3/018 345/467 |
| 2012/0259618 A1 | 10/2012 | Lee et al. |
| 2013/0054225 A1 | 2/2013 | Huang |
| 2014/0019120 A1* | 1/2014 | Shinohara ............. G06F 40/129 704/9 |
| 2014/0095445 A1 | 4/2014 | Deshmukh et al. |
| 2014/0188454 A1 | 7/2014 | Mittal et al. |
| 2015/0178248 A1* | 6/2015 | Hanninen ............... G06T 11/60 715/234 |
| 2015/0261507 A1 | 9/2015 | Bhagavan et al. |
| 2016/0188646 A1 | 6/2016 | Zandani et al. |
| 2017/0091599 A1* | 3/2017 | Harada ................ G06K 15/022 |
| 2017/0308576 A1 | 10/2017 | Brodsky et al. |

* cited by examiner

CHARACTER MATCHING IN TEXT PROCESSING

CROSS-REFERENCE TO RELATED APPLICATIONS

This application is a continuation of U.S. patent application Ser. No. 15/138,819, filed on Apr. 26, 2016, now U.S. Pat. No. 10,169,414 entitled "CHARACTER MATCHING IN TEXT PROCESSING," entire content of which is incorporated herein by reference for all purposes.

BACKGROUND

The present disclosure relates to text processing, and, more specifically, to matching un-shaped characters to shaped characters in a database.

Some languages contain characters which vary in shape based on the location of the character in a word. Such characters can have an "un-shaped" representation of the character and a plurality of "shaped" representations of the character. The plurality of shaped representations of the character correspond to various locations the respective character can appear in a word.

Windows operating system (OS) can store characters and words in un-shaped format. Power Systems or Mainframe computers running various operating systems (e.g., z/OS, OS/400, zLinux etc.) can store characters and words in shaped format. A structured query language (SQL) query can be used to retrieve text data from relational database management systems (RDBMS) storing data in shaped or un-shaped format. Thus, a query containing a string of characters in un-shaped format may not accurately identify a matching string of characters stored in shaped format.

SUMMARY

Aspects of the present disclosure relate to a method comprising determining an original structured query language (SQL) database query comprises a query clause containing a string of one or more un-shaped characters in a first language. Each of the one or more un-shaped characters are associated with a plurality of respective shapes based on a respective location of a respective character in a word. The method can further comprise generating a plurality of respective generated query clauses storing respective shapings of the string of one or more un-shaped characters therein. The method can further comprise combining respective generated query clauses storing respective shapings of the string of one or more characters therein to create a modified SQL database query. The method can further comprise outputting the modified SQL database query to a processor configured to execute the modified SQL database query against one or more databases.

Aspects of the present disclosure further relate to a system comprising a database having text comprising Arabic characters stored in shaped format. The system can further include a user interface configured to receive an original structured query language (SQL) query comprising a function including a LIKE clause having a target text comprising Arabic characters in un-shaped format stored therein. The target text can include one or more wildcard operators. The system can further include a repository containing language shaping rules. The system can further include a processor communicatively coupled to the user interface, the repository, and the database, and configured to receive the original SQL query from the user interface and generate a plurality of respective generated LIKE clauses storing respective shaped target texts therein corresponding to respective shapings of the target text in un-shaped format. The processor can be further configured to create a modified SQL query based on the plurality of respective generated LIKE clauses. The processor can be further configured to execute the modified SQL query on one or more databases, and present, to the user interface, portions of the data in the database according to the modified SQL query.

Aspects of the present disclosure further relate to a computer program product comprising a computer readable storage medium having program instructions embodied therewith. The computer readable storage medium does not comprise a transitory signal per se. The program instructions are executable by a processor to cause the processor to perform a method comprising receiving an original structured query language (SQL) query comprising a function and a LIKE clause containing an original target text including at least one wildcard operator. The LIKE clause is configured to match text from a database to the original target text. The target text comprises one or more characters in Arabic script. The method executed by the processor and based on the program instructions can further comprise generating a plurality of respective shaped target texts based on the original target text and the at least one wildcard operator. Respective shaped target texts comprise shaping respective characters in the original target text according to respective positions of respective characters in the original target text and based on at least one position of the at least one wildcard operator. The method executed by the processor and based on the program instructions can further include combining the plurality of respective shaped target texts to create a modified SQL query and storing the modified SQL query in the computer readable storage medium.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to language processing, and, more specifically, to matching un-shaped characters to shaped characters in a database. A shaped character (also referred to as a visually-stored character or a fully-shaped character) can comprise a unique representation of a character based on a position of the character in a word. An un-shaped character (also referred to as a base character or a base-shaped character) can comprise a standardized representation of the character irrespective of the position of the character in a word. Un-shaped characters can be shaped during, for example, display rendering.

Arabic text is one example of text containing shaped characters. Text including Arabic script characters is associated with numerous languages and dialects including Arabic, Farsi, Urdu, and others. Arabic script characters have four unique representations corresponding to four character positions within a respective word. The four positions are: initial, middle, final, and isolated. In some embodiments, the isolated representation comprises the un-shaped representation of the character. For example, the four representations of the Arabic script character Ain are shown in Table 1:

TABLE 1

Variations of the Arabic Script Character Ain

| Arabic Letter | Position in the word | Letter Shape | Example In a word |
|---|---|---|---|
| ع | Initial | عـ | عمل |
| ع | Middle | ـعـ | يعمل |
| ع | Isolated | ع | يزرع |
| ع | Final | ـع | رائع |

Code points can be used to define shaped and/or un-shaped characters. Code pages such as Extended Binary Coded Decimal Interchange Code (EBCDIC) or Unicode, for example, can be used to store text in shaped format by using respective code points corresponding to respective shaped characters. In cases where the isolated format comprises the un-shaped format, these code pages can also be used to store text in un-shaped format by storing the text using respective code points corresponding to respective isolated formats for the respective characters. Operating systems (OS) supporting EBCDIC or Unicode can, therefore, store Arabic script characters in shaped format. For example, z/OS, IBMi, OS/400, and other operating systems support EBCDIC and can store Arabic script characters in shaped format.

Some code pages support exclusively un-shaped characters. For example, some operating systems and applications (e.g., a Windows system) can have a respective code point representing a respective un-shaped Arabic character. Such systems do not have a respective code point for any shaped character of the un-shaped character. Thus, in such systems, the un-shaped character can be shaped (e.g., replaced with the correct glyph based on the location of the character within a word) by an algorithm configured to define text layout on a user interface.

Databases storing shaped text can be queried using structured query language (SQL). SQL can refer to the programming language designed for managing data held in a Relational Database Management System (RDBMS). Aspects of the present disclosure relate to modifying SQL queries containing un-shaped characters to be configured to locate matching shaped characters. More specifically, aspects of the present disclosure relate to modifying a SQL query containing a LIKE clause having un-shaped target text comprising Arabic script characters and with one or more wildcard operators therein to a plurality of LIKE clauses having a plurality of versions of shaped target text corresponding to respective shapings of the respective Arabic script characters and based on one or more wildcard operators.

Advantageously, aspects of the present disclosure allow a user to search databases storing text in shaped format using queries containing text in un-shaped format by automatically modifying the un-shaped query text to a plurality of shaped query texts. Thus, a search executed by an OS configured to use un-shaped Arabic characters can successfully be matched to identical Arabic characters stored in shaped format. It is to be understood that the aforementioned advantages are example advantages and not all advantages are listed. Furthermore, embodiments of the present disclosure can contain all, some, or none of the aforementioned advantages while remaining within the spirit and scope of the present disclosure.

Figure 1:
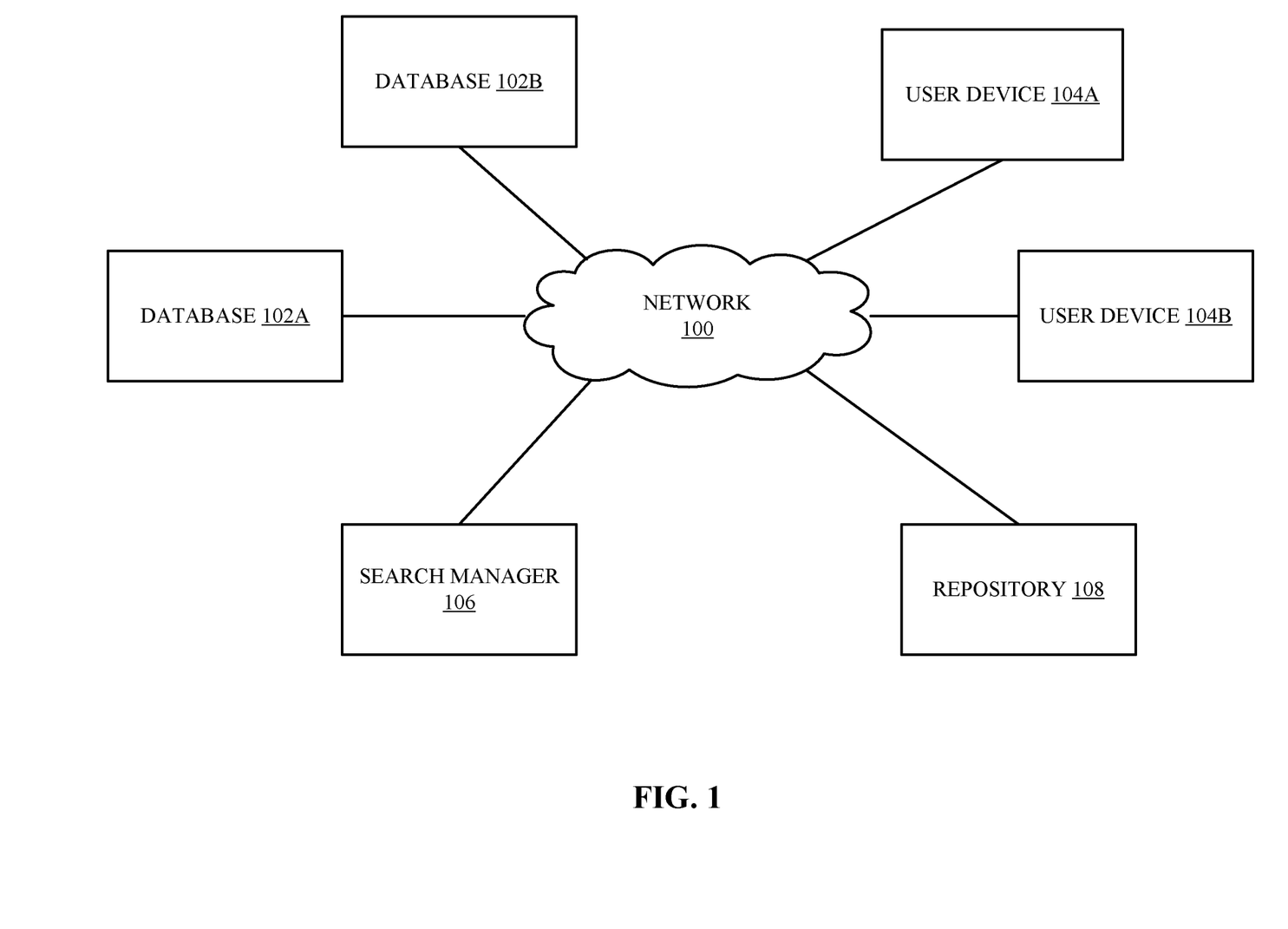
FIG. 1 illustrates a block diagram of a network in accordance with some embodiments of the present disclosure.

Referring now to the Figures, FIG. 1 illustrates a block diagram of a network in accordance with some embodiments of the present disclosure. The network 100 can comprise a physical or virtual network configured to communicatively couple a plurality of devices to one another. The network 100 can be communicatively coupled to one or more user devices 104A and 104B (referred to collectively herein as user device 104). User device 104 can comprise a computer workstation, a laptop, a mobile device, or an application operating on a user device. In some embodiments, the user device 104 stores and processes text in un-shaped format. The network 100 can be communicatively coupled to a search manager 106. The search manager 106 can contain instructions configured to modify an original SQL query having a LIKE clause containing un-shaped characters to a modified SQL query containing a plurality of shaped characters based on the original SQL query. The search manager 106 can receive the original SQL query from a user device 104 via the network 100. The search manager 106 can retrieve SQL query rule data from repository 108 via network 100. Repository 108 can comprise a computer readable storage medium storing SQL rules and language rules. For example, repository 108 can contain rules for shaping a given character in a given language (e.g., Arabic script characters) according to the location of the character in a word in the given language. Search manager 106 can execute modified queries against one or more databases 102A and 102B (hereinafter referred to collectively as database 102) via the network 100. Database 102 can comprise a database storing information in shaped format according to some embodiments of the present disclosure. In some embodiments, database 102 can be, for example, a DB2 database.

Figure 2:
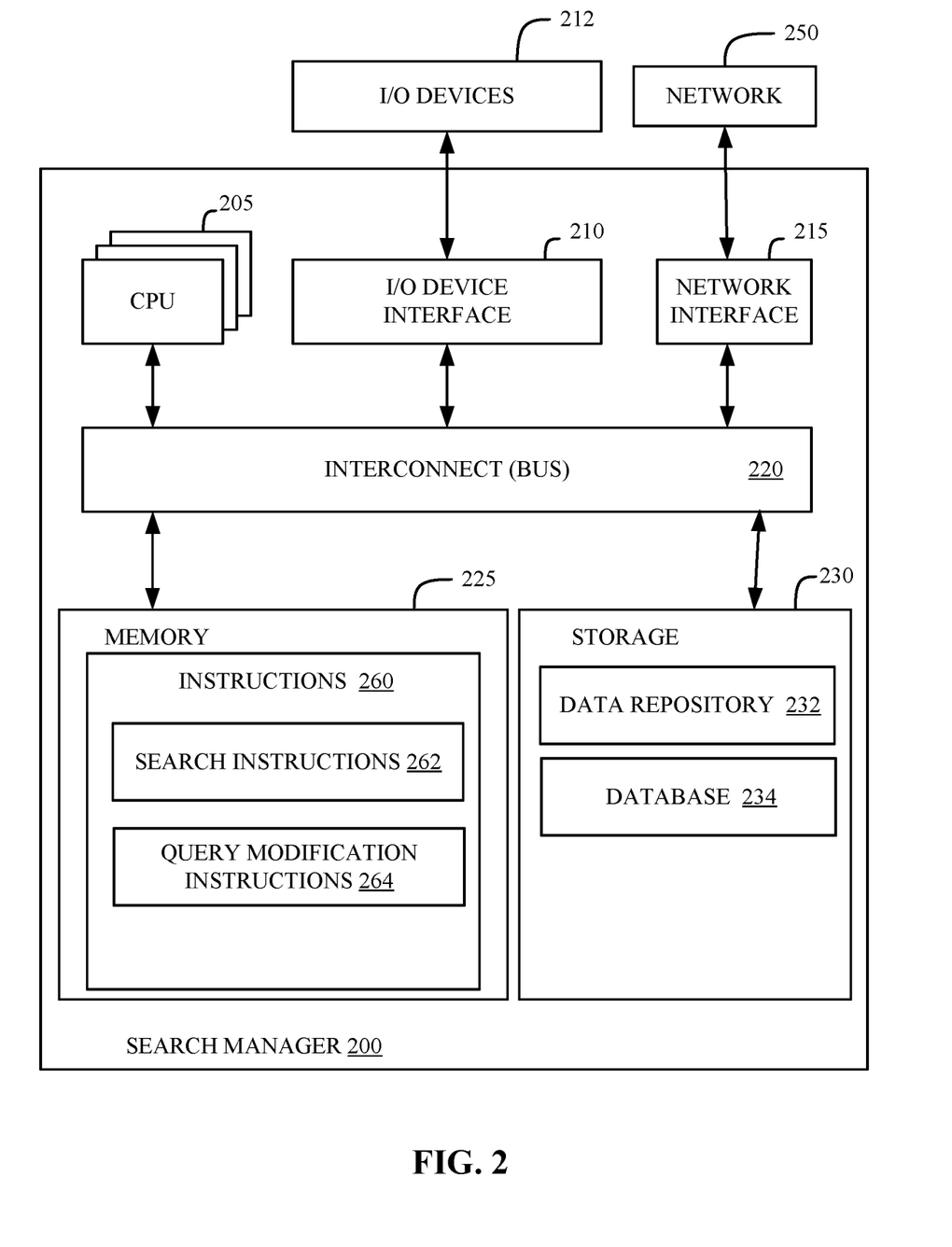
FIG. 2 illustrates a block diagram of a search manager in accordance with some embodiments of the present disclosure.

Referring now to FIG. 2, illustrated is a block diagram of a search manager in accordance with some embodiments of the present disclosure. In some embodiments, the search manager 200 can be consistent with search manager 106 of FIG. 1. The search manager 200 can include a memory 225, storage 230, an interconnect (e.g., BUS) 220, one or more processors (e.g., CPUs) 205, an I/O device interface 210, I/O devices 212, and a network interface 215.

Each CPU 205 retrieves and executes programming instructions stored in the memory 225 or storage 230. The interconnect 220 is used to move data, such as programming instructions, between the CPU 205, I/O device interface 210, storage 230, network interface 215, and memory 225. The interconnect 220 can be implemented using one or more busses. The CPUs 205 (also referred to as processors 205 herein) can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the search manager 200 via the I/O devices 212 or a communication network 250 via the network interface 215.

In some embodiments, the memory 225 stores instructions 260 and the storage 230 stores a data repository 232 and one or more databases 234. However, in various embodiments, the instructions 260, the data repository 232, and the database 234 are stored partially in memory 225 and partially in storage 230, or they are stored entirely in memory 225 or entirely in storage 230, or they are accessed over a network 250 via the network interface 215.

In some embodiments, the data repository 232 is consistent with data repository 108 of FIG. 1. Data repository 232 can store language data such as character-shaping rules for respective characters in respective words for a given language. In some embodiments, data repository 232 contains data for one or more languages including Arabic. Language data can include character-shaping rules and directionality data (e.g., left-to-right (LTR) or right-to-left (RTL) data for respective texts).

In some embodiments, the database 234 is consistent with database 102 of FIG. 1. The database 234 can contain textual data, such as, for example, Arabic script stored in a shaped format. Thus, in some embodiments, database 234 comprises EBCDIC or Unicode code pages.

The instructions 260 can store processor executable instructions for various methods such as the methods shown and described hereinafter with respect to FIG. 3-6. The instructions can include search instructions 262 and query modification instructions 264. Search instructions 262 can store processor executable instructions for executing one or more SQL queries against one or more databases. Query modification instructions 264 can store processor executable instructions for modifying one or more original SQL LIKE clauses having un-shaped text into one or more modified SQL LIKE clauses having shaped text.

In various embodiments, the I/O devices 212 can include an interface capable of presenting information and receiving input. For example, I/O devices 212 can receive a query in SQL format and can present one or more query results based on execution of the original query and/or one or more modified queries. In some embodiments, the network 250 is consistent with network 100 of FIG. 1. The network can connect the search manager 200 with additional data repositories 232, additional databases 234, and/or additional instructions 260.

Figure 3:
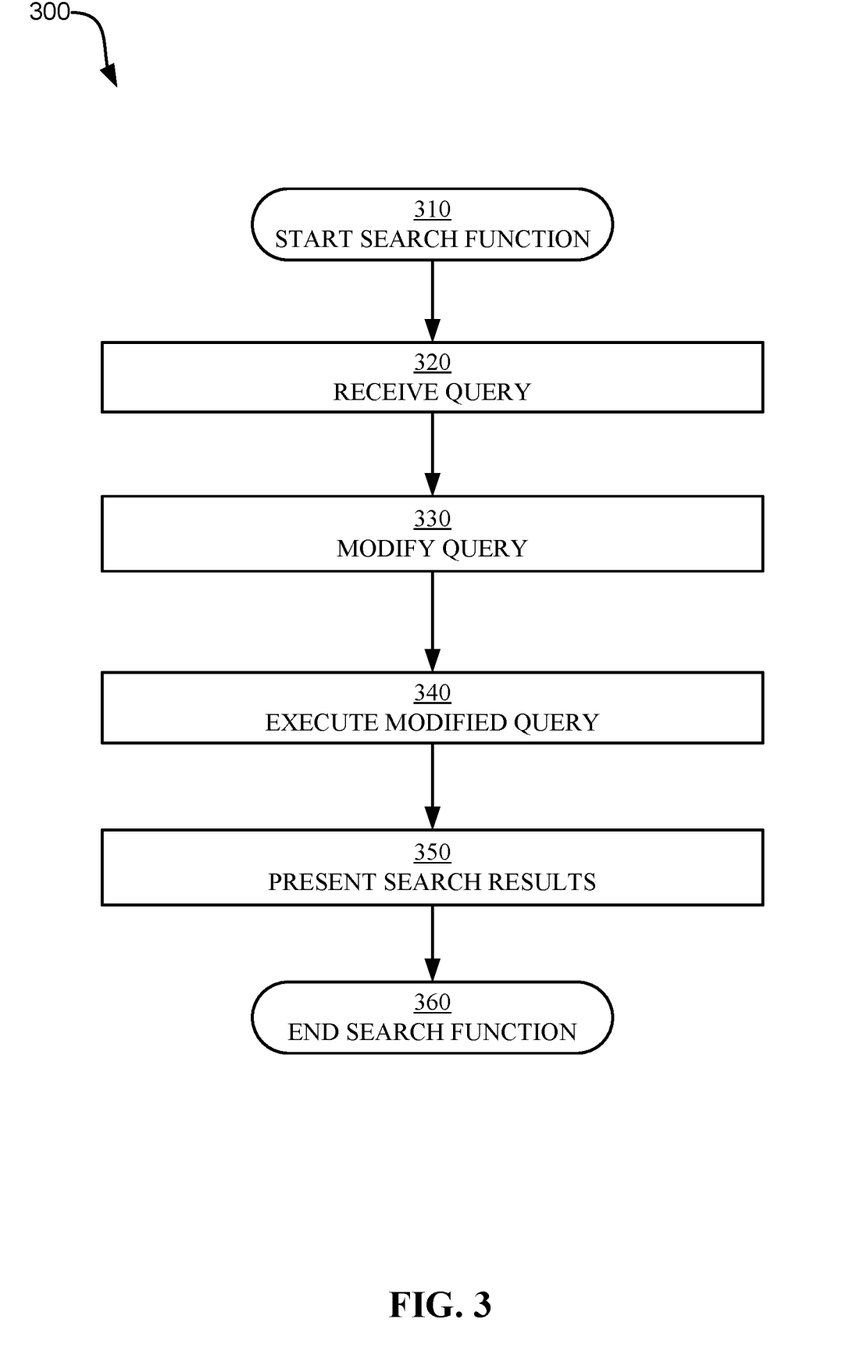
FIG. 3 illustrates a flowchart of an example method for searching a repository containing text in shaped format in accordance with some embodiments of the present disclosure.

Referring now to FIG. 3, illustrated is an example flowchart for a method for searching shaped text using an un-shaped or incompletely shaped query. The method 300 can be executed by one or more processors (e.g., processors 205 of FIG. 2) executing a set of instructions (e.g., search instructions 262 of FIG. 2).

The method 300 can start at operation 310. At operation 320, the processor can receive a query. In some embodiments, the query can be received from a user interface (e.g., I/O device 212 of FIG. 2). In some embodiments, the user interface can be operating on a system configured to store text in un-shaped format (e.g., a Windows system). The query can comprise a SQL query including a function containing a LIKE clause. One example of a function is a SELECT function configured to retrieve data from a specified location matching a target text described by, for example, a LIKE clause contained in the function. As is understood by one of skill in the art, a LIKE clause searches for a specified pattern in one or more databases or portions thereof. The specified pattern can comprise text in a given language. Thus, according to embodiments of the present disclosure, a LIKE clause can be used to match multiple words, single words, or portions of words. For example, a LIKE clause can contain target text "ABC" where "A" is considered an initial character, "B" is considered a middle character, and "C" is considered a final character. A LIKE clause can further contain wildcard operators configured to refine the query. For example, a LIKE clause can contain target text "% ABC" where the percent sign can be a wildcard operator configured to match any word where "A" is considered the initial or middle character, "B" is considered a middle character, and "C" is considered the final character. Likewise, a LIKE clause can search for text "% ABC %" where the percent sign can be a wildcard operator appearing twice and configured to match any word where "A" is considered the initial or middle character, where "B" is considered a middle character, and where "C" is considered the middle or final character.

It is to be understood that the functions, clauses, and operators described herein are examples and are not to be construed as limiting. Some embodiments of the present disclosure can utilize different functions, clauses, and/or operators than those described herein, or the functions, clauses, and/or operators described herein can be used in conjunction with additional functions, clauses, and/or operators.

In operation 330, the processor can modify the un-shaped textual query by generating a plurality of shaped textual queries. The plurality of shaped textual queries can correspond to the various representations of the various characters contained in the received query according to a set of language rules. In addition to the initial, middle, and final formats described above, aspects of the present disclosure can also query respective characters represented in isolated format.

Thus, the search "ABC" received in un-shaped format can be represented by one shaped format (i.e., "A" initial "B" middle "C" final) and one optional format (i.e., "A" isolated "B" isolated "C" isolated).

The search "% ABC" received in un-shaped format can be represented by two shaped formats (i.e., "A" initial "B" middle "C" final, "A" middle "B" middle "C" final) and one optional format (i.e., "A" isolated "B" isolated "C" isolated).

The search "% ABC %" received in un-shaped format can be represented by four shaped formats (i.e., "A" initial "B" middle "C" final, "A" middle "B" middle "C" final, "A"

initial "B" middle "C" middle, "A" middle "B" middle "C" middle) and one optional format (i.e., "A" isolated "B" isolated "C" isolated).

The shaped textual queries can be generated and referred to as v1, v2, v3, v4, etc. corresponding to respective generated versions of a respective original query. For example, the SQL query "% ABC" previously described can have three versions identified as v1, v2, and v3. It is to be understood that more or fewer shaped queries can be generated for respective target texts according to various embodiments of the present disclosure.

The received query can be expanded using OR or UNION SQL operators to create a modified SQL query including the generated shaped textual queries. OR operators append a plurality of query versions to a root function, such as, for example, a SELECT function. OR operators are described in more detail hereinafter with respect to FIG. 5. UNION operators combine results of a plurality of functions, such as, for example, a plurality of SELECT functions. UNION operators are described in further detail hereinafter with respect to FIG. 6.

In operation 340, the processor can execute the modified SQL query against one or more databases. In some embodiments, the one or more databases store text in shaped format (e.g., a DB2 database compatible with EBCDIC and storing shaped Arabic text therein).

In operation 350, the processor can output and/or store the results of the search. Results can be presented to a user interface (e.g., I/O Device 212 of FIG. 2). Alternatively, or in addition, results can be stored in a storage medium (e.g., storage 230 or memory 225 of FIG. 2) which can be physically or virtually connected to the processor executing the query. In operation 360, the method 300 can end.

Thus, FIG. 3 illustrates a flowchart for an example method to execute a SQL query containing un-shaped text against one or more databases containing shaped text or both shaped and un-shaped text (e.g., in cases where text in isolated format corresponds to un-shaped text). In some embodiments, the original SQL query contains a LIKE clause containing text in un-shaped format with zero or more wildcard operators, and the modified SQL query contains a plurality of respective LIKE clauses each corresponding to a respective shaping of respective characters of the text in un-shaped format.

Figure 4:
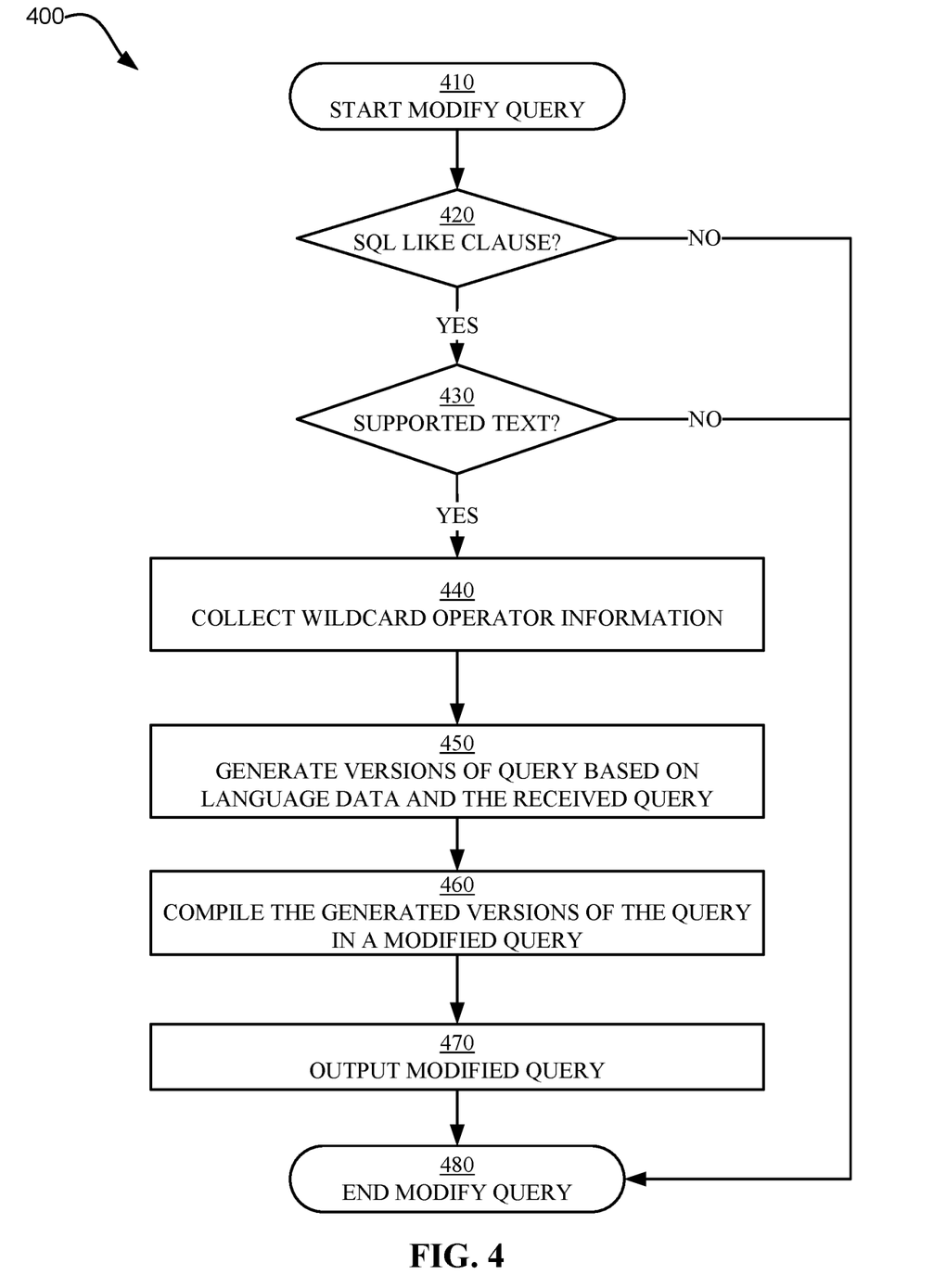
FIG. 4 illustrates a flowchart of an example method for generating a modified query in accordance with some embodiments of the present disclosure.

Referring now to FIG. 4, illustrated is a flowchart of an example method for generating a plurality of versions of a query in accordance with some embodiments of the present disclosure. In some embodiments, the method 400 can be executed by one or more processors (e.g., processors 205) executing a set of instructions (e.g., query modification instructions 264). In some embodiments, the method 400 is a sub-method of operation 330 of FIG. 3.

The method 400 can start at operation 410. Operation 420 can determine if the query comprises a SQL query containing a LIKE clause having target text therein. If operation 420 determines the query does not contain a LIKE clause, the method 400 can proceed to operation 480 and end. If operation 420 determines the query contains a LIKE clause, the method 400 can proceed to operation 430.

In operation 430, the method 400 can determine if the query contains text in a supported language such as, for example, Arabic. Operation 430 can, for example, evaluate code points in the query to determine if the query contains text in a supported language. In the event operation 430 determines the query does not contain a supported text, the method 400 can proceed to operation 480 and end. If operation 430 determines the query does contain text in a supported language, the method 400 can proceed to operation 440.

Operation 440 can collect wildcard operator data present in the target text of the LIKE clause. In various embodiments wildcard operators can be represented by, for example, a percent sign, an asterisk, a question mark, an underscore, or other symbols configured to perform a wildcard function. The wildcard function can be configured to cause one or more characters adjacent to the wildcard operator to be shaped according to two or more positions of the respective character in a respective text.

In operation 450, the processor can generate a plurality of versions of the target text of the query based on language data, the target text in the LIKE clause, and any wildcard operators. In some embodiments, language data can be retrieved from a computer readable storage medium. The language data can comprise correspondence data between un-shaped characters and shaped characters according to a respective position of a respective character within the target text. The plurality of generated versions of the query can comprise a plurality of respective shapings of the target text in the LIKE clause. Respective shapings can comprise respective combinations of shaped characters corresponding to the characters of the query. For example, for a SQL query having a LIKE clause specifying "% ABC" as target text, the processor can generate three versions of the query based on the language data, the target text, and the wildcard operator associated with the target text.

A first version can comprise the shaped characters corresponding to "A" in the initial position, "B" in the middle position, and "C" in the final position.

A second version can comprise the shaped characters corresponding to "A" and "B" in the middle position and "C" in the final position.

A third version of the query can comprise the shaped characters corresponding to "A", "B", and "C" characters being isolated characters. The third version is optional. In some embodiments, the third version is equivalent to the un-shaped version of the target text.

In operation 460, the generated versions of the query can be compiled into a modified query. The modified query can append a plurality of generated versions of the query together in a single function (e.g., a SELECT function) using one or more OR operators. Alternatively, the modified query can combine a plurality of discrete functions containing respective generated versions of the query using one or more UNION operators. Operation 460 is described in greater detail hereinafter with respect to FIG. 5-6.

The method 400 can further include outputting the modified query in operation 470. In some embodiments, the modified query is stored in a computer readable storage medium (e.g., storage 230 or memory 225 of FIG. 2). In alternative embodiments, the modified query is immediately executed against one or more databases (e.g., database 234 of FIG. 2). In alternative embodiments still, the modified query is output to a user interface (e.g., I/O Devices 212 of FIG. 2). In operation 480, the method 400 can end.

Thus, FIG. 4 illustrates a flowchart for an example method for compiling a plurality of shaped versions of an un-shaped Arabic script target text to create a modified SQL query.

Figure 5:
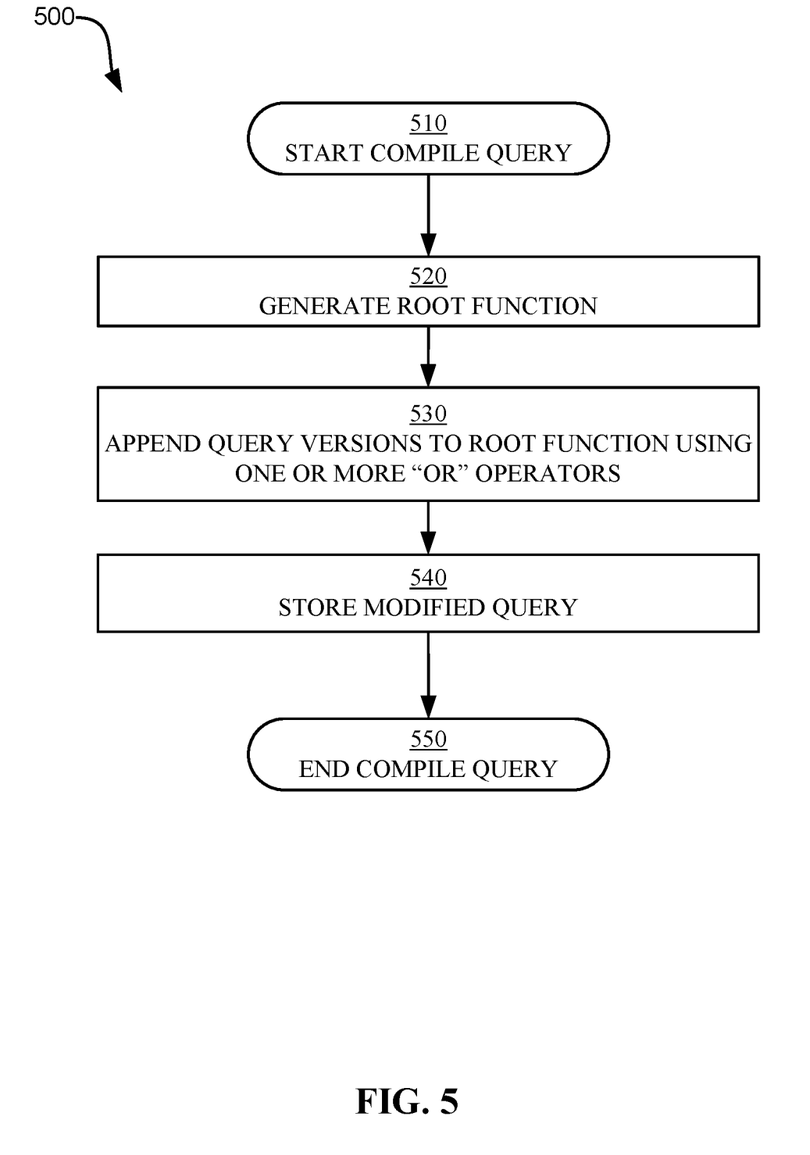
FIG. 5 illustrates a flowchart of an example method for compiling a modified query using one or more OR operators in accordance with some embodiments of the present disclosure.

Referring now to FIG. 5, illustrated is a flowchart for an example method to compile a modified query using one or more OR operators. In some embodiments, the method 500 can be executed by one or more processors (e.g., processors 205 of FIG. 2) executing a set of instructions (e.g., query modification instructions 264 of FIG. 2). In some embodiments, the method 500 is a sub-method of operation 460 of FIG. 4.

The method 500 can begin at operation 510. In operation 520, the method 500 can generate a root function (e.g., a SELECT function). The root function can be the same or substantially the same as a function received in the original SQL query. The root function can define, for example, a location of one or more databases, or portions thereof, from which to retrieve data.

In operation 530, the method 500 can append a plurality of query versions corresponding to respective shapings of a target text to the root function generated in operation 520 using one or more OR operators. Respective query versions can comprise a respective LIKE clause containing a shaped version of the target text according to the output of operation 450 of FIG. 4. Respective OR operators can be configured to apply the root function information to each respective LIKE clause appended to the root function by a respective OR operator.

For example, a user input query comprising "SELECT*FROM My Table WHERE MyArabicText LIKE '% ABC'" can contain a SELECT function having a LIKE clause storing target text "% ABC". Three versions of the target text can be generated and named, for example, v1, v2, and v3. The received query can be converted to a modified query containing the three generated versions of the target text. The modified query can comprise "SELECT*FROM My Table WHERE MyArabicText LIKE 'v1' OR MyArabicText LIKE 'v2' OR MyArabicText LIKE 'v3'". Thus, the OR clause can be configured to modify the root function by appending multiple LIKE clauses to the root function.

In operation 540, the modified query can be stored temporarily or permanently. The modified query can be stored in, for example storage 230 or memory 225 of FIG. 2. In operation 550, the method 500 can end.

Figure 6:
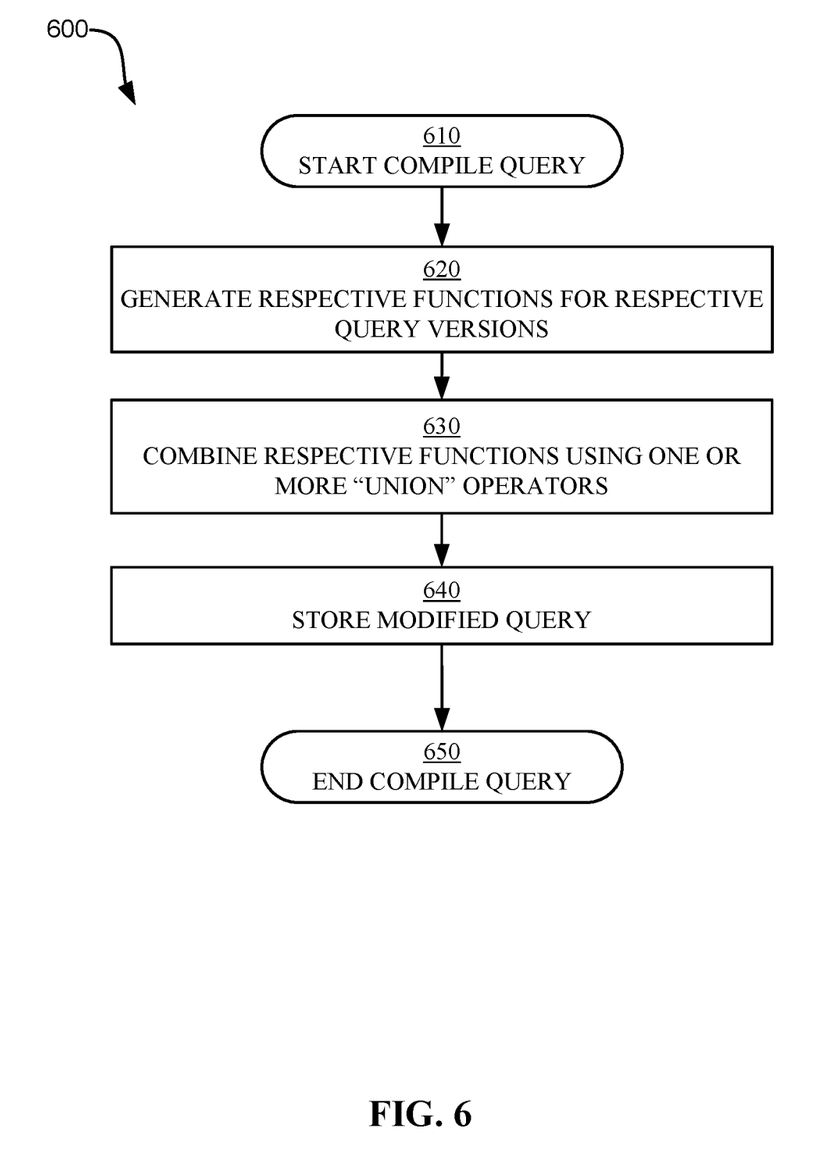
FIG. 6 illustrates a flowchart of an example method for compiling a modified query using one or more UNION operators in accordance with some embodiments of the present disclosure.

Referring now to FIG. 6, illustrated is a flowchart for an example method to compile a modified query using one or more UNION operators. In some embodiments, the method 600 can be executed by one or more processors (e.g., processors 205 of FIG. 2) executing a set of instructions (e.g., query modification instructions 264 of FIG. 2). In some embodiments, the method 600 is a sub-method of operation 460 of FIG. 4.

The method 600 can begin at operation 610. In operation 620, the method 600 can generate a respective root function for each respective query variation. Respective query variations can comprise a respective LIKE clause containing a respective shaped version of the target text according to the output of operation 450 of FIG. 4. The respective root functions can be the same or substantially the same as a function received in the original SQL query. The respective root functions can, for example, define the location of one or more databases against which to execute the query.

In operation 630, the method 600 can combine the plurality of root functions generated in operation 620 using one or more UNION operators. Respective UNION operators can be configured to combine results for a plurality of respective root functions.

For example, a user input query comprising "SELECT*FROM My Table WHERE MyArabicText LIKE '% ABC'" can contain a SELECT function having a LIKE clause containing target text "% ABC". Three versions of the target text can be generated and named, for example, v1, v2, and v3. The received query can be converted to a modified query containing the three generated versions of target text. The modified query can be "SELECT*FROM My Table WHERE MyArabicText LIKE 'v1' UNION SELECT*FROM My Table WHERE MyArabicText LIKE 'v2' UNION SELECT*FROM My Table WHERE MyArabicText LIKE 'v3'". Thus, the UNION clause can combine multiple functions to expand an original SQL query in accordance with embodiments of the present disclosure.

In operation 640, the modified query can be stored temporarily or permanently. The modified query can be stored in, for example storage 230 or memory 225 of FIG. 2. In operation 650, the method 600 can end.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
determining an original structured query language (SQL) database query comprises a query clause containing a string of un-shaped characters in Arabic, wherein each of the un-shaped characters are associated with a plurality of respective shapes based on a respective location of respective un-shaped characters in a word, wherein the plurality of respective shapes comprise an initial position, a middle position, a final position, and an isolated position, and wherein the string comprises a first wildcard operator, a first character, a second character, and a third character;
generating a plurality of respective generated query clauses storing respective shapings of the string of one or more un-shaped characters therein, wherein the plurality of respective generated query clauses comprises:
a first query clause comprising the first character in the initial position, the second character in the middle position, and the third character in the final position;
a second query clause comprising the first character in the middle position, the second character in the middle position, and the third character in the final position; and
a third query clause comprising the first character in the isolated position, the second character in the isolated position, and the third character in the isolated position;
combining respective generated query clauses storing respective shapings of the string of characters therein to create a modified SQL database query;
outputting the modified SQL database query to a processor configured to execute the modified SQL database query against a database; and presenting search results from the modified SQL database query to a user interface.

2. The method of claim 1, wherein the query clause of the original SQL database query comprises a LIKE clause, wherein the plurality of respective generated query clauses comprise a plurality of respective generated LIKE clauses, wherein respective LIKE clauses are configured to search for a respective text stored in the LIKE clause in a database.

3. The method of claim 2, wherein the original SQL database query comprises a SELECT function, wherein the SELECT function is configured to retrieve text from a specified location based on the string of un-shaped characters specified by the query clause.

4. The method of claim 2, wherein combining respective generated query clauses further comprises:
appending respective generated query clauses to a first function using OR operators, wherein respective OR operators are configured to apply the first function to a respective query clause corresponding to a respective OR operator.

5. The method of claim 2, wherein combining respective generated query clauses further comprises:
generating respective functions for respective generated query clauses; and
combining respective generated functions using UNION operators, wherein respective UNION operators are configured to combine results from respective functions connected by respective UNION operators.

6. The method of claim 2, wherein the first wildcard operator is configured to cause characters adjacent to the first wildcard operator in the string of one or more un-shaped characters to have a shaping corresponding to the middle position and the initial position in the plurality of respective generated query clauses.

7. The method of claim 2, wherein the plurality of respective generated query clauses storing respective shapings of the string of un-shaped characters therein is based on a number of characters, a respective type of each respective character, and respective locations of respective wildcard operators in the string of un-shaped characters.

8. A system comprising:
a database comprising Arabic text stored in shaped format, wherein shaped format comprises an initial position, a middle position, a final position, and an isolated position for respective Arabic characters;
a user interface configured to receive an original structured query language (SQL) query comprising a function including a LIKE clause having a target text comprising Arabic characters in un-shaped format stored therein, wherein the target text comprises a first wildcard operator, a first character, a second character, and a third character;
a repository containing language shaping rules; and
a processor communicatively coupled to the user interface, the repository, and the database, and configured to:
receive the original SQL query from the user interface;
generate a plurality of respective generated LIKE clauses storing respective shaped target texts therein corresponding to respective shapings of the target text in un-shaped format, wherein the plurality of respective generated LIKE clauses comprises:
a first query clause comprising the first character in the initial position, the second character in the middle position, and the third character in the final position;
a second query clause comprising the first character in the middle position, the second character in the middle position, and the third character in the final position; and
a third query clause comprising the first character in the isolated position, the second character in the isolated position, and the third character in the isolated position;
create a modified SQL query based on the plurality of respective generated LIKE clauses;
execute the modified SQL query on a database; and
present, to the user interface, portions of the data in the database according to the modified SQL query.

9. The system of claim 8, wherein the original SQL query comprising a function further comprises a SELECT function configured to retrieve text from a selected one or more databases matching target text contained in a LIKE clause corresponding to the SELECT function.

10. The system of claim 8, wherein the processor configured to create a modified SQL query is further configured to:
append the plurality of respective generated LIKE clauses to a root function using respective OR operators, wherein respective OR operators are configured to apply the root function to respective generated LIKE clauses corresponding to respective OR operators.

11. The system of claim 8, wherein the processor configured to create a modified SQL query is further configured to:
generate respective generated functions for each respective generated LIKE clause; and
combine respective generated functions using one or more UNION operators, wherein respective UNION operators are configured to combine results of respective generated functions containing respective generated LIKE clauses storing respective shaped target texts therein.

12. The system of claim 8, wherein the processor configured to generate respective generated LIKE clauses storing respective shaped target texts therein corresponding to respective shapings of the target text in un-shaped format is further configured to:
replace respective code points corresponding to respective un-shaped characters of the target text with respective code points corresponding to respective shaped representations of respective characters of the target text based on the respective characters, respective positions of respective characters in the target text, and respective locations of respective wildcard operators.

13. The system of claim 8, wherein the processor configured to generate a plurality of respective generated LIKE clauses storing respective shaped target texts therein corresponding to respective shapings of the target text in un-shaped format is further configured to generate a plurality of respective generated LIKE clauses storing respective shaped target texts therein corresponding to two respective directionalities of each respective shaping of the target text in un-shaped format.

14. A computer program product comprising a computer readable storage medium having program instructions embodied therewith, wherein the computer readable storage medium does not comprise a transitory signal per se, wherein the program instructions are executable by a processor to cause the processor to perform a method comprising:
receiving an original structured query language (SQL) query comprising a function and a LIKE clause containing an original target text including Arabic text in un-shaped format, wherein the LIKE clause is configured to match text from a database storing Arabic text in shaped format to the original target text, wherein shaped format comprises an initial position, a middle position, a final position, and an isolated position for respective Arabic characters, wherein the original target text comprises a first wildcard operator, a first character, a second character, and a third character;

generating a plurality of respective shaped target texts based on the original target text and the first wildcard operator, wherein the plurality of respective shaped target texts comprises:
- a first query clause comprising the first character in the initial position, the second character in the middle position, and the third character in the final position;
- a second query clause comprising the first character in the middle position, the second character in the middle position, and the third character in the final position; and
- a third query clause comprising the first character in the isolated position, the second character in the isolated position, and the third character in the isolated position;

combining the plurality of respective shaped target texts to create a modified SQL query;

storing the modified SQL query in the computer readable storage medium;

executing the modified SQL query on the database storing Arabic text in shaped format; and presenting, to a user interface, portions of the database matching the modified SQL query.

15. The computer program product of claim 14, wherein the program instructions are further configured to cause the processor to perform a method further comprising:
storing portions of the database matching the modified SQL query in the computer readable storage medium.

16. The computer program product of claim 14, wherein the first wildcard operator is configured to cause characters adjacent to the first wildcard operator in the target text to have a shaping corresponding to the middle position and the initial position in the plurality of respective shaped target texts.

17. The computer program product of claim 16, wherein the program instructions configured to generate a plurality of respective shaped target texts are further configured to cause the processor to perform a method further comprising:
replacing respective code points corresponding to un-shaped representations of respective characters of the target text with respective code points corresponding to respective shaped representations of the respective characters of the target text based on the respective characters, respective positions of respective characters in the target text, and respective locations of respective wildcard operators.

18. The computer program product of claim 17, wherein respective code points comprise Extended Binary Coded Decimal Interchange Code (EBCDIC).

19. The computer program product of claim 14, wherein combining the plurality of respective shaped target texts to create a modified SQL query comprises appending respective shaped texts to a first function using respective OR operators, wherein respective OR operators are configured to apply the first function to respective shaped target texts corresponding to respective OR operators.

20. The computer program product of claim 14, wherein combining the plurality of respective shaped target texts to create a modified SQL query comprises combining respective functions using one or more UNION operators, wherein respective functions comprise a respective shaped target text therein, wherein the one or more UNION operators are configured to combine results from respective functions connected by respective UNION operators.

* * * * *